(12) United States Patent
Kwolek et al.

(10) Patent No.: US 9,010,841 B1
(45) Date of Patent: Apr. 21, 2015

(54) VEHICLE DOOR TRIM PANEL ASSEMBLY

(71) Applicant: Toyota Motor Engineering & Manufacturing North America, Inc., Erlanger, KY (US)

(72) Inventors: Chad A. Kwolek, Hartland, MI (US); Charles P. Patterson, New Boston, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/095,508

(22) Filed: Dec. 3, 2013

(51) Int. Cl.
B60J 5/00 (2006.01)
B60R 13/02 (2006.01)

(52) U.S. Cl.
CPC ..... B60R 13/0243 (2013.01); B60R 2013/0293 (2013.01)

(58) Field of Classification Search
CPC ............ B60R 13/0243; B60R 21/0428; B60R 2013/0287; B60R 13/0206; B60J 5/0416; B60J 10/0031; E05Y 2900/55; B29L 2031/3014
USPC .......... 296/146.7, 13.08, 146.1, 146.2, 146.5; 49/502; 24/297
See application file for complete search history.

(56) References Cited

U.S. PATENT DOCUMENTS

| 4,422,724 | A | * | 12/1983 | Otsuka et al. | 359/875 |
|---|---|---|---|---|---|
| 4,432,167 | A | * | 2/1984 | Watanuki | 49/502 |
| 4,605,260 | A | * | 8/1986 | Sakakibara et al. | 296/201 |
| 4,790,590 | A | * | 12/1988 | Ito et al. | 296/146.1 |
| 4,943,109 | A | * | 7/1990 | Skrbina et al. | 296/146.4 |
| 5,150,941 | A | * | 9/1992 | Silzer et al. | 296/152 |
| 5,584,144 | A | * | 12/1996 | Hisano | 49/502 |
| 5,697,665 | A | * | 12/1997 | Itou et al. | 296/146.1 |
| 5,746,471 | A | * | 5/1998 | Teramoto et al. | 296/146.1 |
| 6,039,449 | A | * | 3/2000 | Dolan et al. | 359/871 |
| 6,213,537 | B1 | * | 4/2001 | Butz et al. | 296/152 |
| 7,025,920 | B2 | * | 4/2006 | Pavao et al. | 264/250 |
| 7,156,449 | B2 | * | 1/2007 | Vijaywargiya et al. | 296/146.6 |
| 7,707,777 | B2 | * | 5/2010 | Takeuchi et al. | 49/502 |
| 7,806,462 | B2 | * | 10/2010 | Horneck | 296/146.2 |
| 7,992,915 | B2 | | 8/2011 | Kwolek | |
| 8,276,961 | B2 | | 10/2012 | Kwolek | |
| 8,371,632 | B2 | | 2/2013 | Akaba | |
| 8,506,098 | B2 | * | 8/2013 | Murata | 359/871 |

(Continued)

FOREIGN PATENT DOCUMENTS

GB 2101184 A 1/1983
JP 6192917 5/1986

(Continued)

Primary Examiner — Kiran B Patel
(74) Attorney, Agent, or Firm — Gifford, Krass, Sprinkle, Anderson & Citkowski, P.C.

(57) ABSTRACT

A door assembly for an automotive vehicle. The door assembly includes a vehicle door frame and an upper trim panel mounted to the vehicle door frame. The upper trim panel having an upper surface where the upper surface is angled down towards the exterior of the vehicle. The door assembly further including a sub-assembly having a first trim panel and a second trim panel. The first trim panel is mounted to the vehicle door frame behind the upper trim panel. A bracket on the first trim panel adapted to accept the second trim panel. A first surface of the first trim panel and a second surface of the second trim panel rest within the same plane to create a flush surface to give the same or a similar appearance of a one piece trim panel assembly.

9 Claims, 6 Drawing Sheets

(56) References Cited

U.S. PATENT DOCUMENTS

| | | |
|---|---|---|
| 8,585,123 B2 | 11/2013 | Itou et al. |
| 2006/0117706 A1 | 6/2006 | Hooker et al. |
| 2008/0127569 A1* | 6/2008 | Boddy et al. .................. 49/502 |

FOREIGN PATENT DOCUMENTS

| | | |
|---|---|---|
| JP | 2004224257 A | 8/2004 |
| JP | 2012232635 A | 11/2012 |
| JP | 201332100 A | 2/2013 |

* cited by examiner

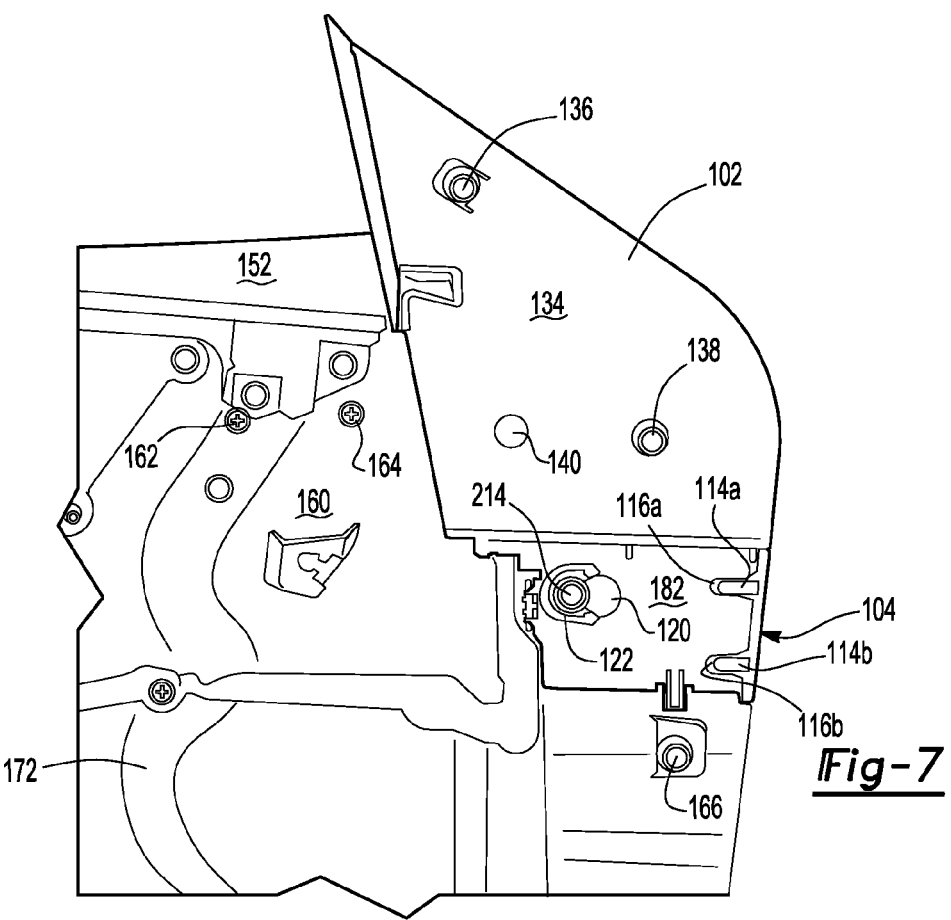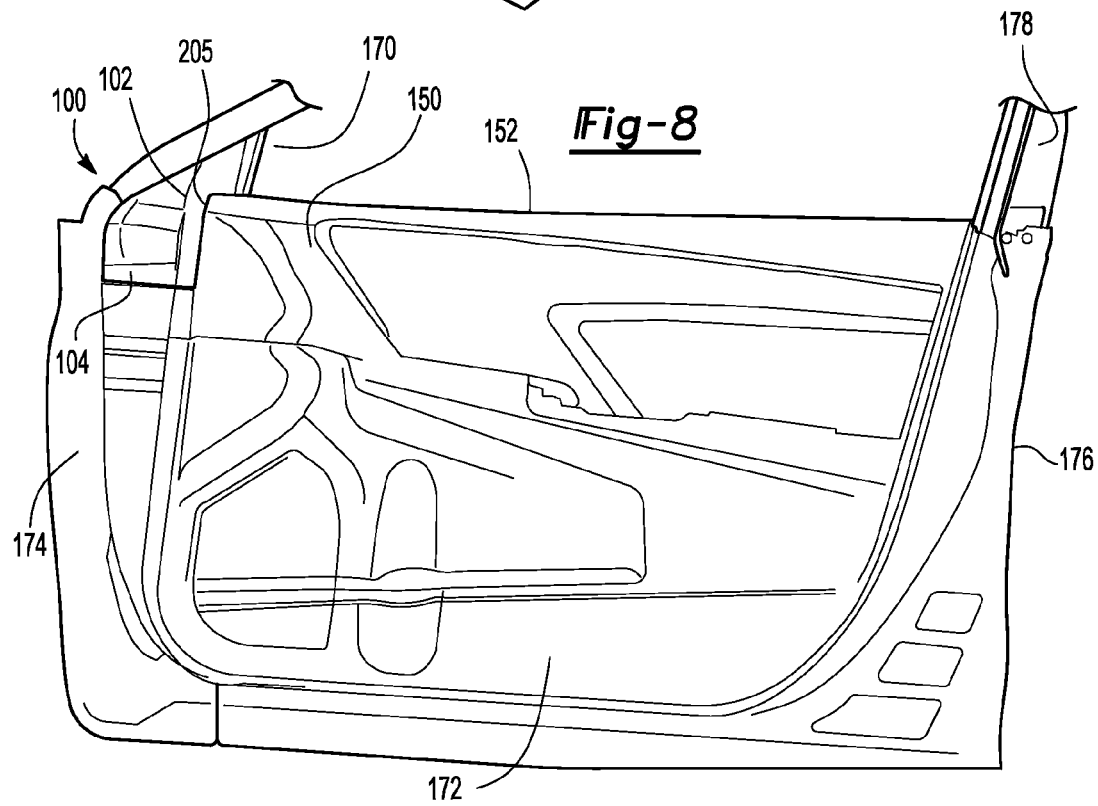

VEHICLE DOOR TRIM PANEL ASSEMBLY

FIELD OF THE INVENTION

The present invention relates generally to trim panels. More particularly, the present invention relates to trim panels for use on a vehicle door.

BACKGROUND OF THE INVENTION

Vehicle door trim pieces, also termed "sail garnishes" in the relevant technical art, including those as those illustrated in FIGS. 1-4, are well known in the art. The sail garnish as shown in FIGS. 1-4 is a one piece construction mounted to a vehicle door frame. This one piece assembly mounts next to and after an upper trim door panel is attached. As shown in FIG. 2, the upper portion of the upper trim panel of the prior art slopes inwards towards the interior of the vehicle. This arrangement made it simple to include a one piece sail garnish in the overall door assembly.

More particularly, the previous design made it easy to install a one piece sail garnish after the upper trim panel has been installed. However, with design changes of the upper trim panel, specifically changes to the sloping of the upper portion of the upper trim panel, previously known designs of sail garnishes are not compatible with these new designs. Accordingly, there exists a need in the art to provide a trim piece or sail garnish compatible with a upper trim panel having an upper portion and upper surface which angles outwards towards the exterior of the vehicle.

SUMMARY OF THE INVENTION

The present invention provides for a door assembly for a vehicle. The assembly includes a door frame and an interior trim panel mounted to the vehicle door frame. The door trim panel has an upper surface which is angled down towards the exterior of the vehicle.

The door assembly further includes a sail trim sub-assembly having a first trim panel and a second trim panel. The first trim panel includes a first surface and the second trim panel includes a second surface. The first trim panel is mounted to the vehicle door frame behind the interior trim panel. A bracket is further provided on the first trim panel adapted to accept the second trim panel. The first surface of the first trim panel and the second surface of the second trim panel are co-planar to give the same or similar appearance of a one piece trim panel assembly. The second trim panel acts as a cover to allow all three surfaces of the first trim panel, the second trim panel, and the vehicle door interior trim panel to rest flush with one another to create a cohesive look.

BRIEF DESCRIPTION OF THE DRAWINGS

Reference will now be made to the attached drawings when read in combination with the following detailed description, wherein like reference numbers refer to like parts throughout the several views, and in which:

FIG. 7 illustrates a rear view of the two piece trim panel sub-assembly;

FIG. 8 illustrates a frontal view of the installed trim panel sub-assembly;

DETAILED DESCRIPTION OF THE INVENTION

Figure 1:
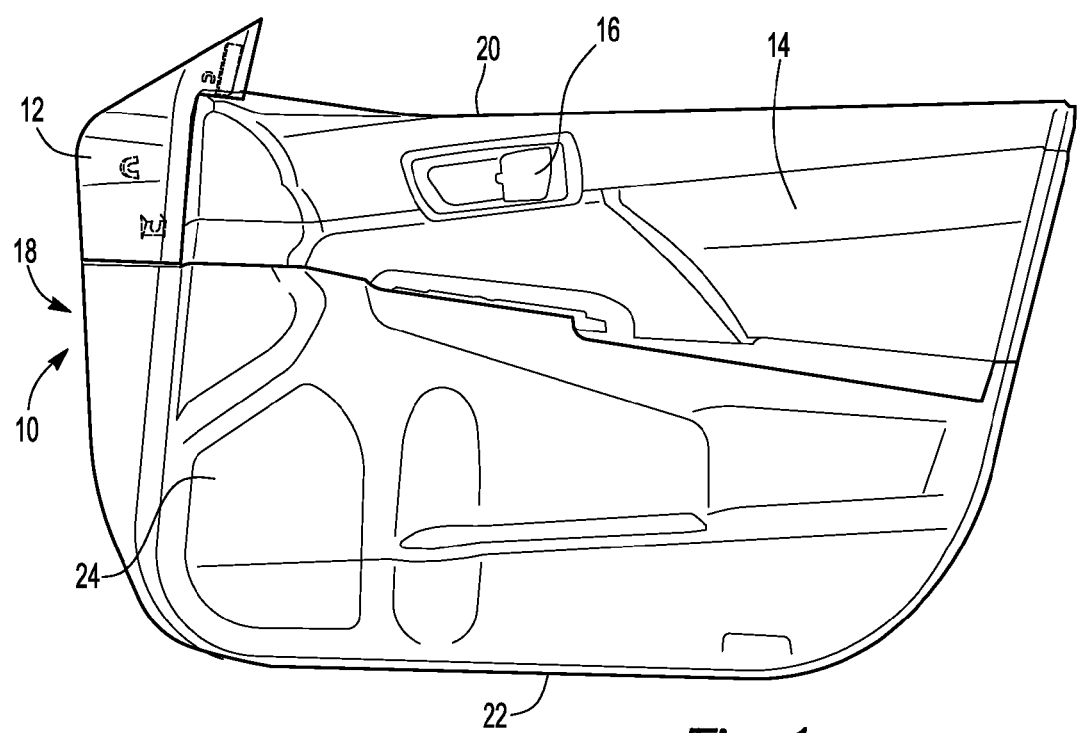
FIG. 1 illustrates a front view of the door assembly of the prior art.

The present invention discloses a two piece sail assembly compatible with current design door trim panels having an upper surface slanting towards the exterior of the vehicle. The sail trim assembly is a two piece construction including a first trim panel (a sail shaped garnish) and a cover or second trim panel operable to connect to a bracket portion of the first trim panel. When the second trim panel is connected to the first trim panel, the upper surfaces of both the first panel and the second trim panel rest flush with one another and within the same plane to create an aesthetically pleasing appearance of the door assembly.

As previously explained, FIGS. 1-4 illustrate a door assembly according to the prior art. The door assembly of the prior art includes the sail garnish trim panel 12 being a one piece construction. The door assembly 10 further includes an upper trim panel 14 having a door handle portion 16. The door assembly 10 further includes a lower trim panel 18. The door assembly 10 includes an upper edge 20 and a lower edge 22.

Figure 2:
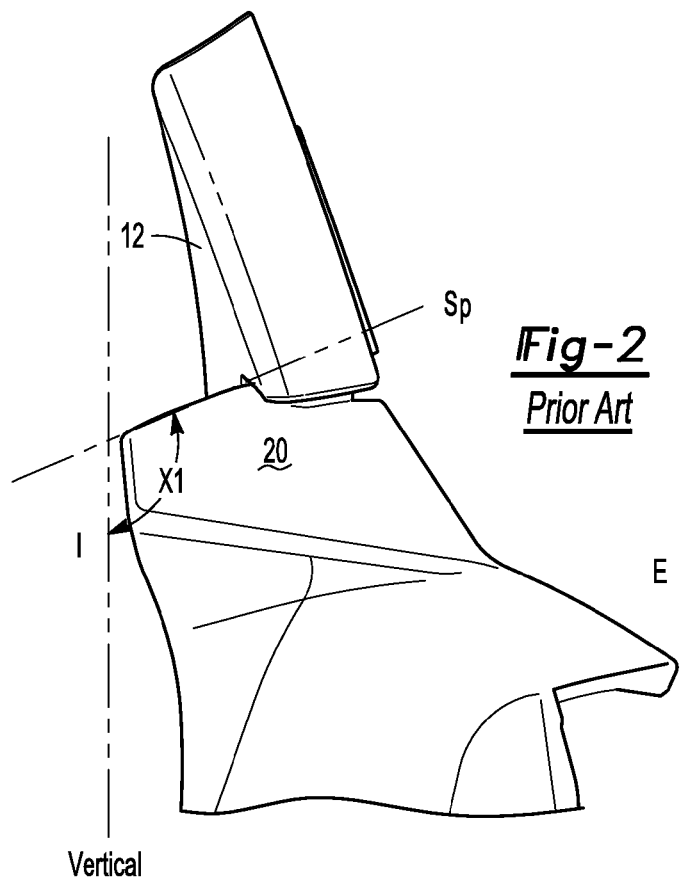
FIG. 2 illustrates a side view of the upper portion of the door assembly of the prior art.
Figure 3:
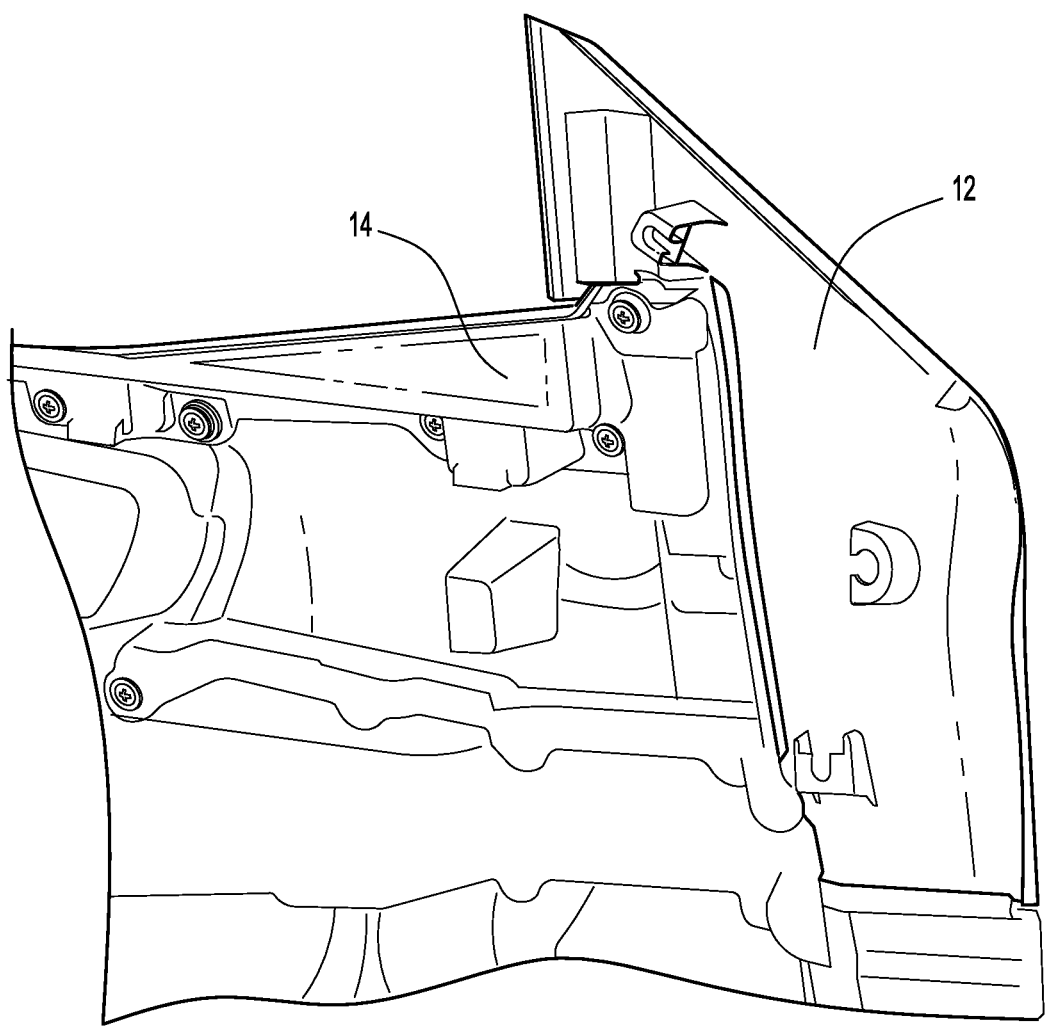
FIG. 3 illustrates a rear view of the door assembly of the prior art.
Figure 4:
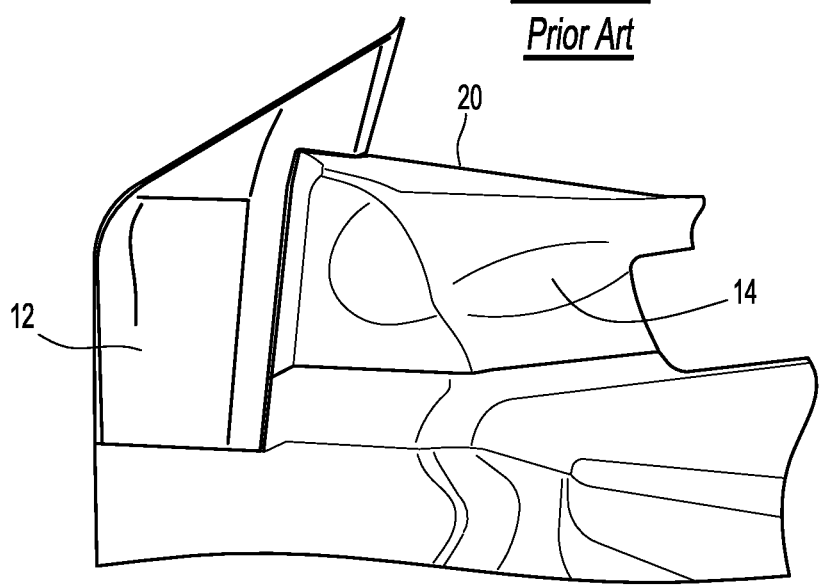
FIG. 4 illustrates a partial and enlarged front view of the door assembly of the prior art, as shown in FIG. 1.

In the prior art, the upper edge 20 includes an upper surface angled towards the interior of the vehicle. This angle is illustrated in FIG. 2 of the prior art by the plane $S_p$. The design of the prior art includes the styling of having the upper edge 20 and upper surface of the door assembly 10 sloping or angled towards the vehicle interior. The trim panel 12 of the prior art was installed following installation of both trim panels 14, 18 were installed.

The styling and design requirements of current design trim panels, specifically the upper trim panels, have an upper portion of the trim panel sloping towards the exterior of the vehicle. These design requirements of the door assembly trim panels do not permit use of previously known sail garnish trim panel designs such as the trim panel 12 to be used. Furthermore, use of the previously known trim panel 12 with current design door assembly trim panels creates an unappealing and uncohesive appearance of the assembly. As such, the improved design is illustrated in FIGS. 5-10 according to the present invention.

Figure 5:
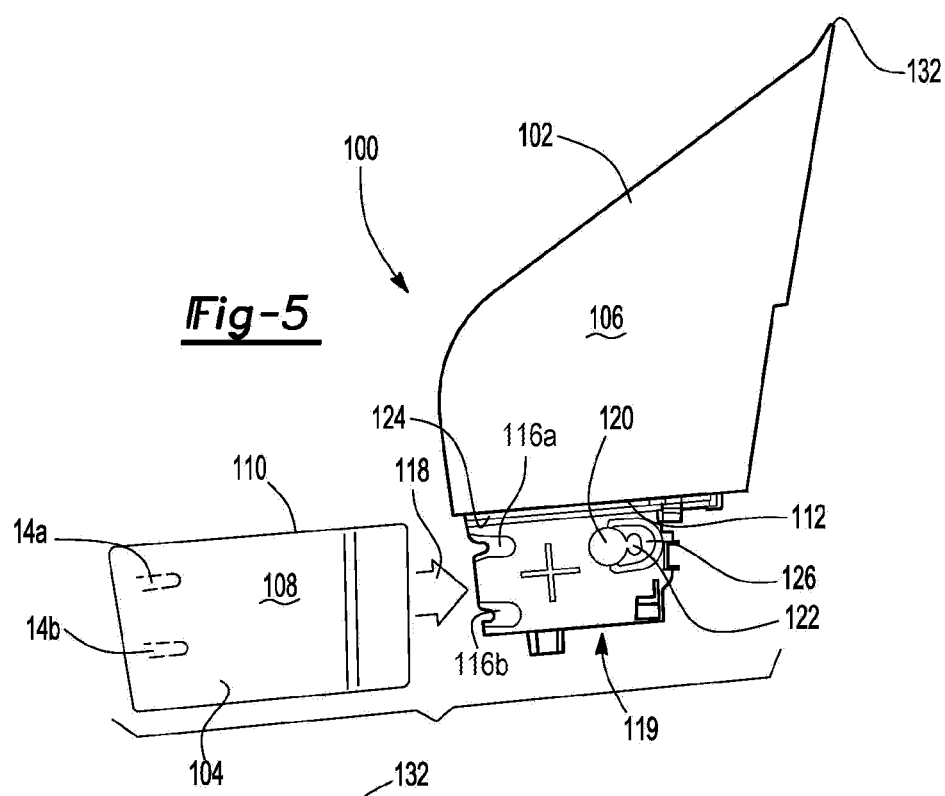
FIG. 5 illustrates a frontal exploded view of a two piece door trim sub-assembly according to one non-limiting example of the present invention.

FIG. 5 illustrates an exploded view of the sail garnish trim panel sub-assembly 100 of the present invention. The trim panel sub-assembly 100 includes a sail garnish first trim panel 102 and the cover or second trim panel 104. The first trim panel 102 and the second trim panel 104 (or cover) are adapted to connect together to create an aesthetic appearance of the overall door assembly. The first trim panel 102 is generally sail shaped and thus may also be referred to as a sail garnish. The first trim panel 102 includes a first surface 106. The first surface 106 rests flush and within the same plane as the second trim panel 104. The second trim panel 104 includes an upper edge 110. Further, the first trim panel 102 includes a middle edge 112.

When in the installed position, the upper edge 110 of the second trim panel 104 rests adjacent to the middle edge 112 of the first panel 102. The second trim panel 104 further includes hook structures 114a, 114b projecting from an inner surface. The hook or hook-like structures 114a, 114b connect to the slot members 116a, 116b of the first trim panel 102. As illustrated by the movement arrow 118, the second trim panel 104 slidably connects to the first trim panel 102 and snaps fit by means of the hook structures 114a, 114b and the slots 116a, 116b.

The first panel 102 further includes a lower bracket portion 119. The lower bracket portion 119 is slightly indented from the surface 106 of the first panel 102. The bracket portion 119 includes the slots 116a, 116b. The bracket portion 119 further includes the apertures 120, 122 to accept a locator portion 214 of the second trim panel 104. The apertures 120, 122 are surrounded by the elevated and ramped portion 126 to provide structure and support to the connection portion.

Figure 6:
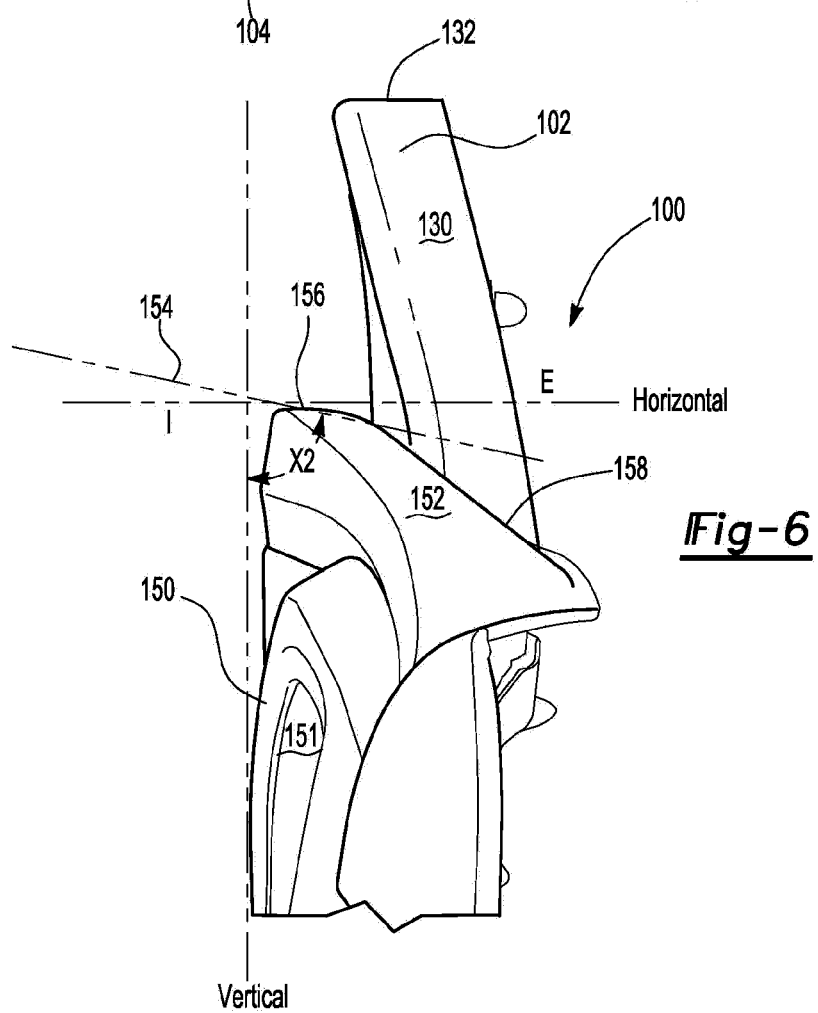
FIG. 6 illustrates a side view of the two piece door trim sub-assembly of FIG. 5.

FIG. 6 illustrates a side perspective view of the trim panel sub-assembly 100. The first trim panel 102 includes a side edge surface 130 and an upper edge 132. Now in reference to FIGS. 6 and 8, the door assembly includes a frame 174 having an upper panel 150 and a lower panel 172. The frame 174 is generally a stamped metal, plastic, or other suitable material forming the shape of the vehicle door. In the present embodiment, the frame 174 is a stamped metal portion allowing the various trim panels to connect thereto by means of connectors or other fasteners. In other embodiments, the frame may be more of a skeleton or frame like structure outlining the size and shape of the door with various supports. The frame 174 of the present embodiment is a solid one piece construction.

The upper panel 150 includes an upper edge 152. New styling designs have the upper edge or upper surface 152 slanting towards the exterior of the vehicle as illustrated in FIG. 6. The upper surface 152, as illustrated by a plane 154 shown in FIG. 6, extends from an upper edge 156 near the interior I of the vehicle towards a lower edge 158 towards the exterior E of the vehicle. The plane 154 generally angles downwards towards the exterior of the vehicle in relation to a generally horizontal plane. Further defined, the plane 154 creates an angle X2 with a generally vertical plane in relation to a front surface 151 of the upper panel 150. The front surface 151 is generally vertical. This angle X2 has a predetermined measurement of less than 90 degrees. This compares to the prior art (see FIG. 2 of the prior art) where the angle X1 has a predetermined measurement of greater than 90 degrees. As such, the slanted construction as illustrated in FIG. 6 requires the first trim panel 102 to be installed and mounted to the frame 174 before the upper panel 150 is installed to the frame 174. After the upper panel 150 is installed to the frame 174, the second panel 104 is mounted to the bracket 119 of the first trim panel 102 to create an aesthetically appealing appearance allowing the surfaces 106, 108 to rest within the same plane.

FIG. 7 illustrates a rear view of the first panel 102 and the second panel 104 installed on the frame 174 of the door assembly. The frame 174 includes a rear surface 160. The panels 150, 172 are mounted to the frame 174 and secured by various apertures 162, 164. The first panel 102 includes a rear surface 134. The first panel 102 further includes connection structures 136, 138, 140 allowing the first panel 102 to connect to the frame 174 of the door assembly.

The door assembly of FIG. 8 illustrates a window portion 170. The window portion 170 is the area where the window contained within the door assembly is mounted. This window may be adjustable and when in an open position rests within the frame 174. The door assembly further includes an edge portion 176 and upper support portions 178 for creating the frame of the vehicle and support for the window and window portion 170. The trim panel sub-assembly 100 of the present invention rests adjacent to the window and window portion 170 and also adjacent or close to the windshield of a vehicle.

Figure 9:
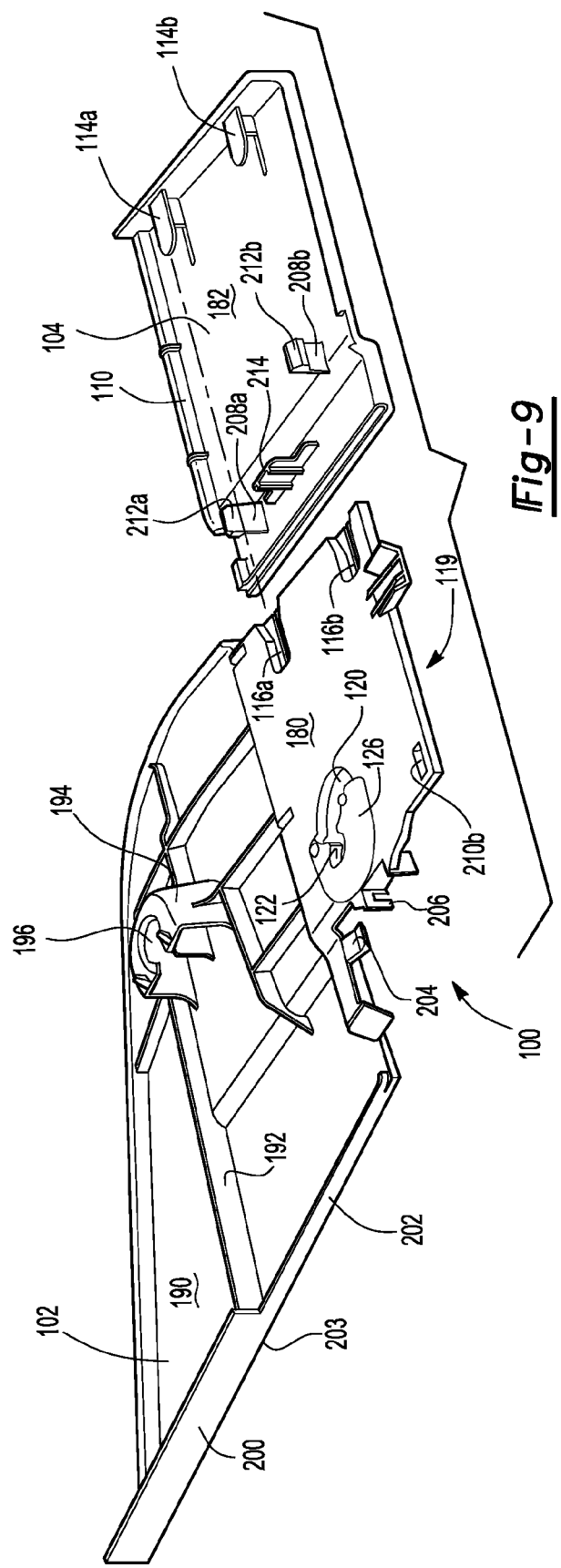
FIG. 9 illustrates a reverse rotated and an exploded perspective view of the two piece door trim sub-assembly of FIG. 5.
Figure 10:
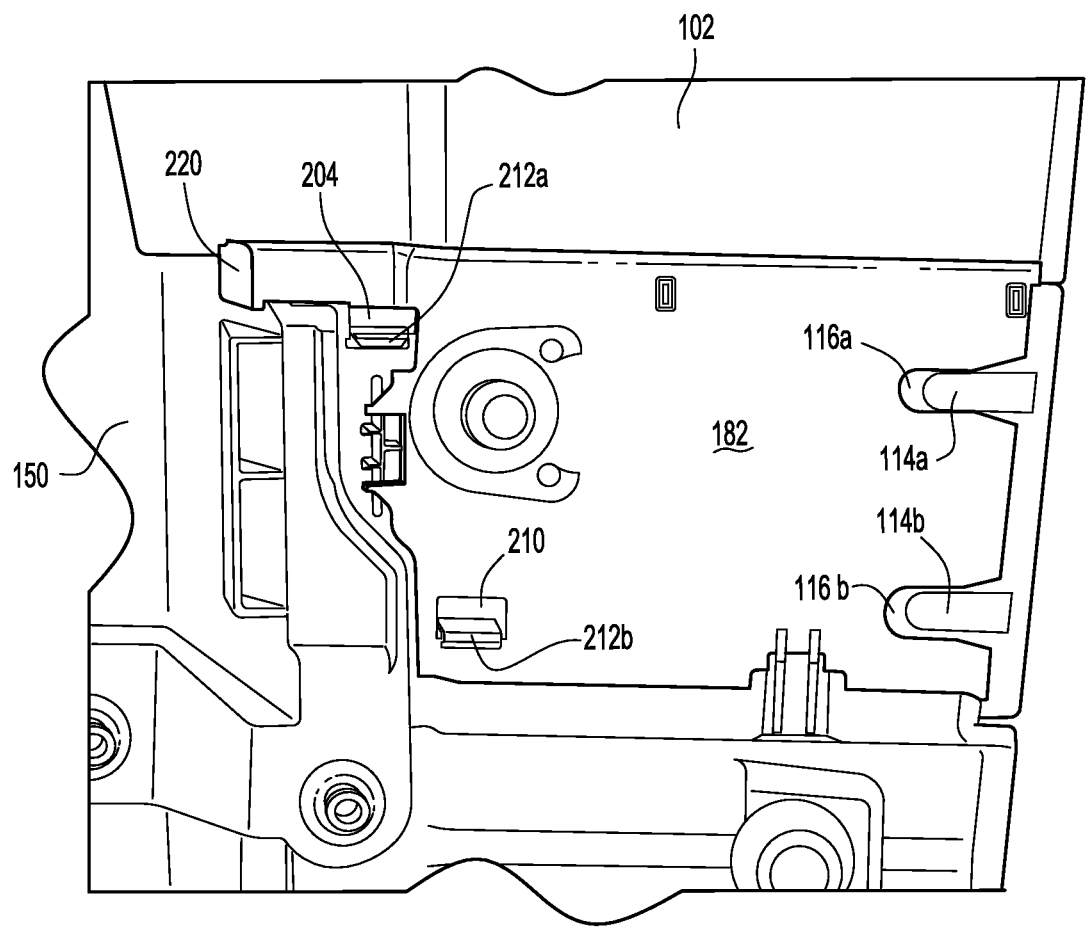
FIG. 10 illustrates a close up rear view of the installed two piece door trim sub-assembly of the present invention.

FIG. 9 illustrates an exploded perspective view of the rear of the trim panel sub-assembly 100. The second trim panel 104 further includes a locator portion 214. The locator portion 214 is operable to securely connect to in a snap fit construction the apertures 120, 122. As the second trim panel 104 is slid and connected to the bracket 119 of the first trim panel 102, the locator 214 is first inserted into the first aperture 120 and then slid into the second and smaller aperture 122. The aperture 122 is also used to connect the lower panel 104 to sheet metal of the door, or the door frame. An attachment portion on the sheet metal connects to the aperture 122.

Tabs 208a, 208b are operable to connect to the aperture 210 and the tab 204, also in the snap fit construction. The tabs 208a, 208b include upper portions 212a, 212b having a larger upper end allowing the tabs 208a, 208b to flex and snap into place when inserted on and into the bracket 119 and into the aperture 210 and connected to the aperture 204. The tabs 208a, 208b have an angled surface allowing the tabs to easily slide into the apertures 210a, 210b, flex as they are inserted and lock into place. The angled surfaces of the tabs 208a, 208b further include a lower planar portion operable to contact the surface surrounding the aperture 210 when the tabs 208a, 208b are in an inserted and locked position. The tab 208a connects to the tab 204 to create a secure connection.

The first trim panel 102 includes a rear surface 190. The rear surface 190 includes various support ribs 192 and connection structures 194, 196. The first panel 102 further includes edge portions 200, 202 and connection structure 206. The edge portions 200, 202 are adapted to rest adjacent to an edge portion of the upper panel 152. The edge portions 200, 202 create an aesthetically appealing appearance and aesthetically appealing seam between an edge 203 of the first trim panel 102 and an edge 205 of the upper panel 150.

The present invention further includes the method of installing the two-piece sail trim panel sub-assembly 100. The method is used in accordance with the apparatus of the present invention as described above. The method including the steps of installing a first trim panel to a frame of a vehicle door frame, the first trim panel having a first surface, installing a vehicle door interior trim panel to the vehicle door frame and mounting a second trim piece to the first trim panel in a snap-fit engagement, the second trim piece having a second surface, the first surface and the second surface mounted within the same plane. The method of assembling a vehicle door wherein the method further includes the step of installing the first trim panel adjacent to a window of the vehicle door. The trim panel portions are connected to the vehicle door frame 174 of the door assembly by means of bolts, connectors, screws or other fasteners. The second trim panel connects to the first trim panel by means of a bracket on the first trim panel.

The invention is not restricted to the illustrative examples and embodiments described above. The embodiments are not intended as limitations on the scope of the invention. Methods, apparatus, compositions, and the like described herein exemplary and not intended as limitations on the scope of the invention. Changes therein and other uses will occur to those skilled in the art. The scope of the invention is defined by the scope of the appended claims.

We claim:

1. A door assembly for a vehicle comprising:
   a vehicle door having a frame;

an upper panel mounted to the vehicle door frame, the upper panel having an upper surface, the upper surface angled down towards the exterior of the vehicle, a generally front surface of the upper panel, a predetermined angle formed between the upper surface and the front surface being less than 90°;

a sub-assembly having a first trim panel and a second trim panel, the first trim panel having a first surface, the second trim panel having a second surface, the first trim panel mounted to the vehicle door frame and behind an interior trim panel;

a bracket on the first trim panel adapted to accept the second trim panel; and the first surface of the first trim panel and the second surface of the second trim panel within the same plane.

2. The door assembly for the automotive vehicle of claim 1 wherein the sub-assembly is mounted adjacent to a window.

3. The door assembly for the automotive vehicle of claim 1 wherein the second trim panel connects to the first trim panel in a snap fit engagement.

4. The door assembly for the automotive vehicle of claim 3 wherein the second trim panel includes snap fit tabs to connect to at least one aperture on the first trim panel.

5. The door assembly for an automotive vehicle of claim 4 wherein the snap fit tabs connect to at least one secondary tab on the first trim panel.

6. The door assembly for an automotive vehicle of claim 4 wherein the second trim panel includes elongated tabs to connect to at least one slot on the first trim panel.

7. The door assembly for an automotive vehicle of claim 6 wherein the elongated tabs are U-shaped.

8. The door assembly for an automotive vehicle of claim 1 wherein an edge portion of the first trim panel abuts the vehicle door interior trim panel.

9. The door assembly for an automotive vehicle of claim 1 wherein an edge portion of the second trim panel abuts the vehicle door interior trim panel.

\* \* \* \* \*